US006870669B2

(12) United States Patent
Watanabe

(10) Patent No.: US 6,870,669 B2
(45) Date of Patent: Mar. 22, 2005

(54) VARIABLE-POWERED BINOCULARS

(75) Inventor: Naomi Watanabe, Saitama (JP)

(73) Assignee: Kamakura Koki Co., Ltd., Saitama (JP)

( * ) Notice: Subject to any disclaimer, the term of this patent is extended or adjusted under 35 U.S.C. 154(b) by 0 days.

(21) Appl. No.: 10/665,023

(22) Filed: Sep. 22, 2003

(65) Prior Publication Data

US 2004/0095642 A1 May 20, 2004

(30) Foreign Application Priority Data

Sep. 25, 2002 (JP) ....................................... 2002-280093

(51) Int. Cl.$^{7}$ ................................................ G02B 23/00

(52) U.S. Cl. ........................ 359/425; 359/410; 359/407; 359/643

(58) Field of Search ................................ 359/362–432, 359/642–647, 694–706; 396/72–82, 373–386

(56) References Cited

U.S. PATENT DOCUMENTS 4,548,481 A * 10/1985 Yamada ....................... 359/421
5,576,892 A * 11/1996 Hotta et al. ................. 359/696
6,059,721 A * 5/2000 Rudischhauser et al. .... 600/167
6,229,653 B1 * 5/2001 Kanai .......................... 359/643

FOREIGN PATENT DOCUMENTS

JP 52-66446 * 6/1977 ................. 359/643
JP 2001-194593 * 7/2001 ................. 359/407

* cited by examiner

*Primary Examiner*—Thong Q Nguyen
(74) *Attorney, Agent, or Firm*—Rader, Fishman & Grauer PLLC

(57) ABSTRACT

A pair of variable-powered binoculars include a pair of objective lens systems; a pair of prism systems, each of the prism system inverting an image that advances through the corresponding objective lens systems, from an inverted image to an erecting image; a pair of concave adjusting lenses, each of the concave adjusting lenses placed between a focus formed by the corresponding objective lens system and the corresponding prism system, so that each of the concave adjusting lenses is movable along the optical axis formed by the corresponding objective lens system and the corresponding prism system; and a pair of ocular lens systems, each of the ocular lens systems placed on the optical axis, so that each ocular lens system is movable along the optical axis closer to or away from the corresponding concave adjusting lens, synchronizing with a movement of the corresponding concave adjusting lens.

6 Claims, 22 Drawing Sheets

Optical System of Variable-Powered Binoculars of the Invention (Prior Art)

(B)

(A)

(B)

(A)

(B)

(A)

(B)

(A)

(B)

(A)

(B)

(A)

(A)

(B)

(A)

(B)

(B)

(A)

VARIABLE-POWERED BINOCULARS

TECHNICAL FIELD

The present invention relates to a pair of variable-powered binoculars. More particularly, it provides a pair of binoculars with a pair of ocular zoom lens systems, of which magnifying power is varied by synchronously moving concave adjusting lenses and the ocular zoom lens systems.

BACKGROUND ART

One example of variable-powered binoculars that are able to vary their magnifying power continuously is a pair of binoculars with ocular zoom lens systems. The ocular lens system of this type of binoculars is provided with at least a first lens placed closer to the eye and a second lens placed near the concave adjusting lens. Sometimes, a third lens is further placed between the first and second lenses. With the binoculars having ocular zoom lens systems, the user can continuously vary their magnifying power by moving the second lens closer to or away from the first lens. This type of binoculars can vary the magnifying power largely through a small movement of the second lens along the optical axis, which leads to an advantageous miniaturization of the binoculars. Due to this advantage, almost all of the existing variable-powered binoculars employ the ocular zoom lens system.

FIG. 1 is a schematic illustration of the optical system of the conventional variable-powered binoculars with an ocular zoom lens system. FIG. 1(A) shows the optical arrangement when the system has a low magnifying power of 7, while FIG. 1(B) the arrangement when the system has a high magnifying power of 15. In FIGS. 1(A) and 1(B), reference numeral 1 depicts an objective lens, reference numeral 2 an ocular lens, reference numeral 3 a prism system, reference numeral 4 a concave adjusting lens, reference numeral 5 a field lens, reference numeral 6 an objective image forming plane, and reference numeral 7 an apparent image forming plane. In the optical system of FIG. 1, the objective lens 1, the ocular lens 2 and the prism system 3 are fixed, while the concave adjusting lens 4 and the field lens 5 are movable along the optical axis of the optical system in FIG. 1. When the magnification is small as shown in FIG. 1(A), the concave adjusting lens 4 is located at position a, and the field lens 5 at position c. To change the magnification from a low one shown in FIG. 1(A) to a high one shown in FIG. 1(B), the concave adjusting lens 4 is moved to position b in FIG. 1(B) and the field lens 5 to position d in the same figure. These two lenses are moved by turning a zoom lever or a zoom ring (not shown in the figures) which the variable-powered binoculars have. When the zoom lever or zoom ring is turned, the concave adjusting lens 4 and the field lens 5, which are interlocked, shift together along the optical axis of the optical system. When the user of the variable-powered binoculars would like to see a magnified image of an object, s/he needs to turn the zoom lever or zoom ring to a position where the lens system gives him/her the desired magnification.

However, since the conventional variable-powered binoculars have a mechanism in which the magnification is changed by moving two lenses, the concave adjusting lens and the field lens, they have difficulties in providing a large visual field and keeping a high resolution. It is because the quality of an image tends to change, which is caused by change in stigmatism when the magnifying power was changed from a low one to a high one. Besides, because of the difference between the eye relief when the arrangement is set for a high magnification and that when the arrangement is for a low magnification, the user sometimes cannot see some objects very well. Moreover, since the concave adjusting lens and the field lens have to be interlocked in the conventional variable-powered binoculars, the mechanical structure to interlock them is complicated, and therefore the production or assembly of the binoculars is not always easy.

SUMMARY OF THE INVENTION

One objective of the present invention is to provide a pair of variable-powered binoculars capable of keeping a high resolution over a wide magnification range, from a low magnification to a high, without causing much change in the quality of the image.

Another objective of the present invention is to provide a pair of variable-powered binoculars capable of securing a wide view, especially a wide apparent view when the binoculars have a low magnification.

Still another objective of the present invention is to provide a pair of variable-powered binoculars capable of making small the difference between the eye relief of a low magnifying arrangement and that of a high magnifying arrangement when they are switched, while capable of keeping the eye relief long.

A still further objective of the invention is to provide a pair of variable-powered binoculars which has a relatively simple mechanical structure and of which production or assembly is easy.

Other objectives and features of the invention will be apparent from the following explanations.

In order to achieve the foregoing objectives, the present invention provides a pair of variable-powered binoculars, which comprises:

a pair of objective lens systems;

a pair of prism systems, each of the prism system inverting an image that advances through each of the objective lens systems, from an inverted image to an erecting image;

a pair of concave adjusting lenses, each of the concave adjusting lenses placed between the focus formed by the corresponding objective lens system and the corresponding prism system, so that each of the concave adjusting lenses is movable along the optical axis formed by the corresponding objective lens system and the corresponding prism system; and a pair of ocular lens systems, each of the ocular lens systems placed on the optical axis, so that each ocular lens system is movable along the optical axis closer to or away from the corresponding concave adjusting lens, synchronizing with a movement of the corresponding concave adjusting lens.

Another aspect of the present invention is the pair of the variable-powered binoculars wherein each of said ocular lens systems is movable on the optical axis so that the focus of each ocular lens system can be adjusted to the focus of the corresponding objective lens system that has been changed by the movement of the corresponding concave adjusting lens.

Still another aspect of the present invention is the pair of the variable-powered binoculars wherein each of the ocular lens systems comprises combined lenses.

The pair of variable-powered binoculars having the features described in the foregoing, since the whole ocular lens systems thereof, each comprising the combined plural lenses, are moved together, which is different from the typical way employed for conventional binoculars, can keep unchanged the location where the apparent image is formed. The ocular lens system of the invention can reduce a change in stigmatism caused by moving at least one lens of the ocular lens system in the conventional variable-powered binoculars. Therefore the pair of binoculars can provide images of which qualities are almost unchanged and keep its resolution, without deterioration, from a low magnification to a high magnification at such a high level as that of single-powered binoculars.

The apparent visual field means the angle of an apparent image made by the binoculars, the angle which the outgoing beams make at the point of the eye with respect to the apparent image. With the binoculars of the present invention, since the whole ocular lens system is moved together, the difference in stigmatism between a low magnification arrangement and a high magnification arrangement can be reduced. This technical feature assures a wide visual field. Conventional binoculars with an ocular zoom lens system that have been adjusted so that the apparent visual field is large at a high magnification typically provide an apparent visual field of less than 40° when the lenses of the ocular lens system are moved to a low magnification arrangement. As a result, when the magnifying power is low, the narrow apparent visual field provides a narrow visual field, which hinders the user from a comfortable observation. On the other hand, the binoculars of the present invention are capable of keeping substantially unchanged the apparent visual field when the arrangement is for a low magnification and when it is for a high magnification. Even when the ocular lens system is designed so that the apparent visual field at a high magnification is 50° or more, a wide apparent visual field of 50° or over at a low magnification is assured by moving the whole ocular lens system together to set the system to the low magnification arrangement.

Further, with the conventional zoom lens binoculars, since one of the lenses that comprise the ocular lens system is moved, the focal length of the ocular lens system at a low magnification is different from that at a high magnification, which results in a large difference between the eye relief when the arrangement is set for a high magnification and that when the arrangement is set for a low magnification. Consequently, the user sometimes cannot see some objects very well with conventional binoculars. On the other hand, since the pair of variable-powered binoculars in accordance with the present invention is capable of making small the difference between the eye relief of the low magnifying arrangement and that of the high magnifying arrangement when they are switched, which makes it possible for the user to see the objects that could not be observed well with the conventional binoculars. Needless to say, it also assures a long eye relief.

BRIEF DESCRIPTION OF THE DRAWINGS

FIG. 1(A) shows an optical arrangement when the system has a low magnification, while FIG. 1(B) an arrangement when the system has a high magnification.

FIG. 2(A) shows an optical arrangement when the system has a low magnification, while FIG. 2(B) an arrangement when the system has a high magnification.

EXPLANATION OF REFERENCE NUMERALS

8: objective lens, 9: ocular lens system, 10: prism system, 11: concave adjusting lens (concave lens), 12: objective image forming plane, 13: apparent image forming plane, 20: variable-powered binoculars, 27: objective lens, 28: ocular lens system, 29: Porro prism, 30: concave adjusting lens, 31: magnification-varying mechanism

DETAILED DESCRIPTION OF THE PREFERRED EMBODIMENTS

Figure 1:
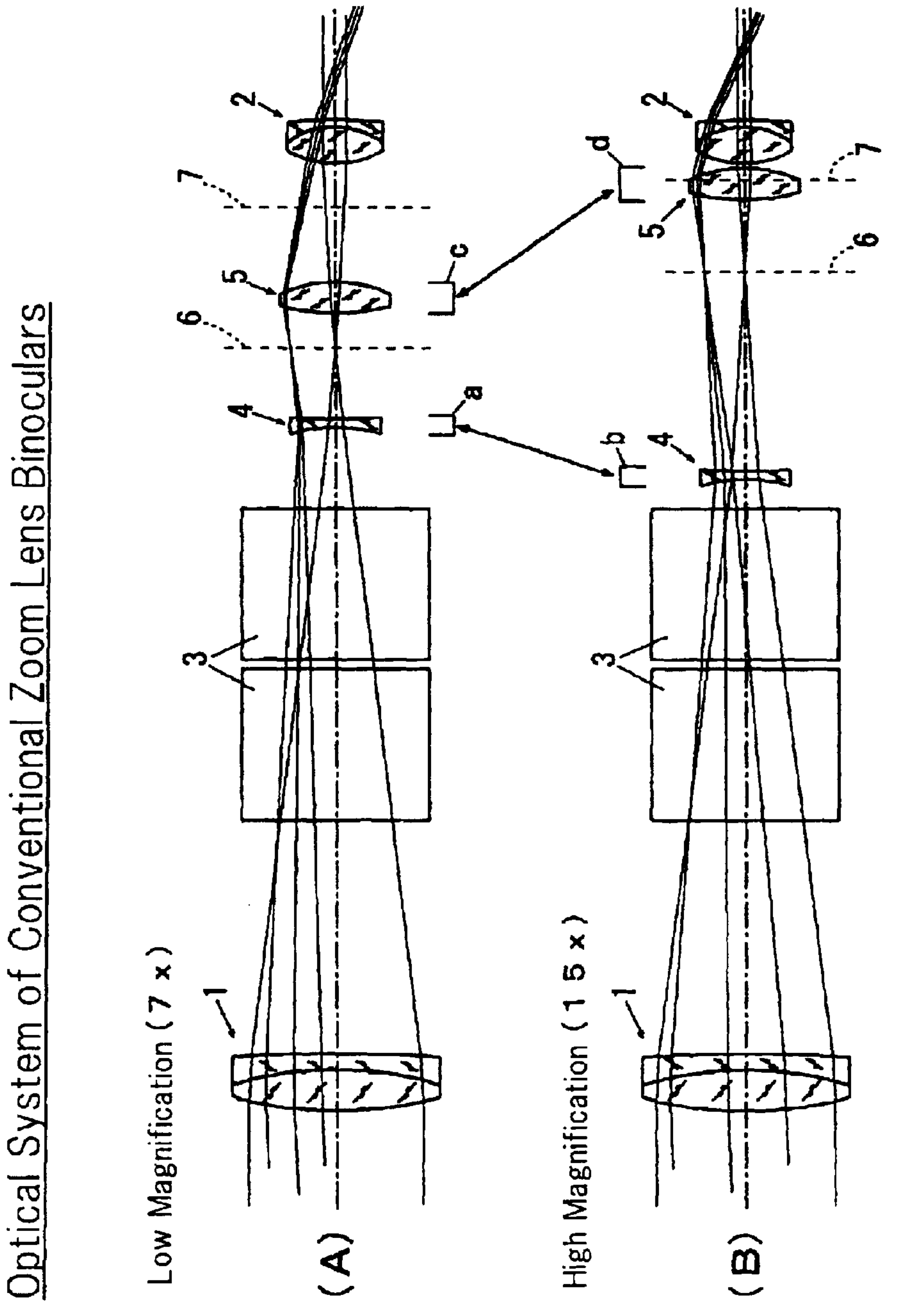
FIG. 1 is a schematic illustration of the optical system of the conventional variable-powered binoculars with an ocular zoom lens system.
Figure 2:
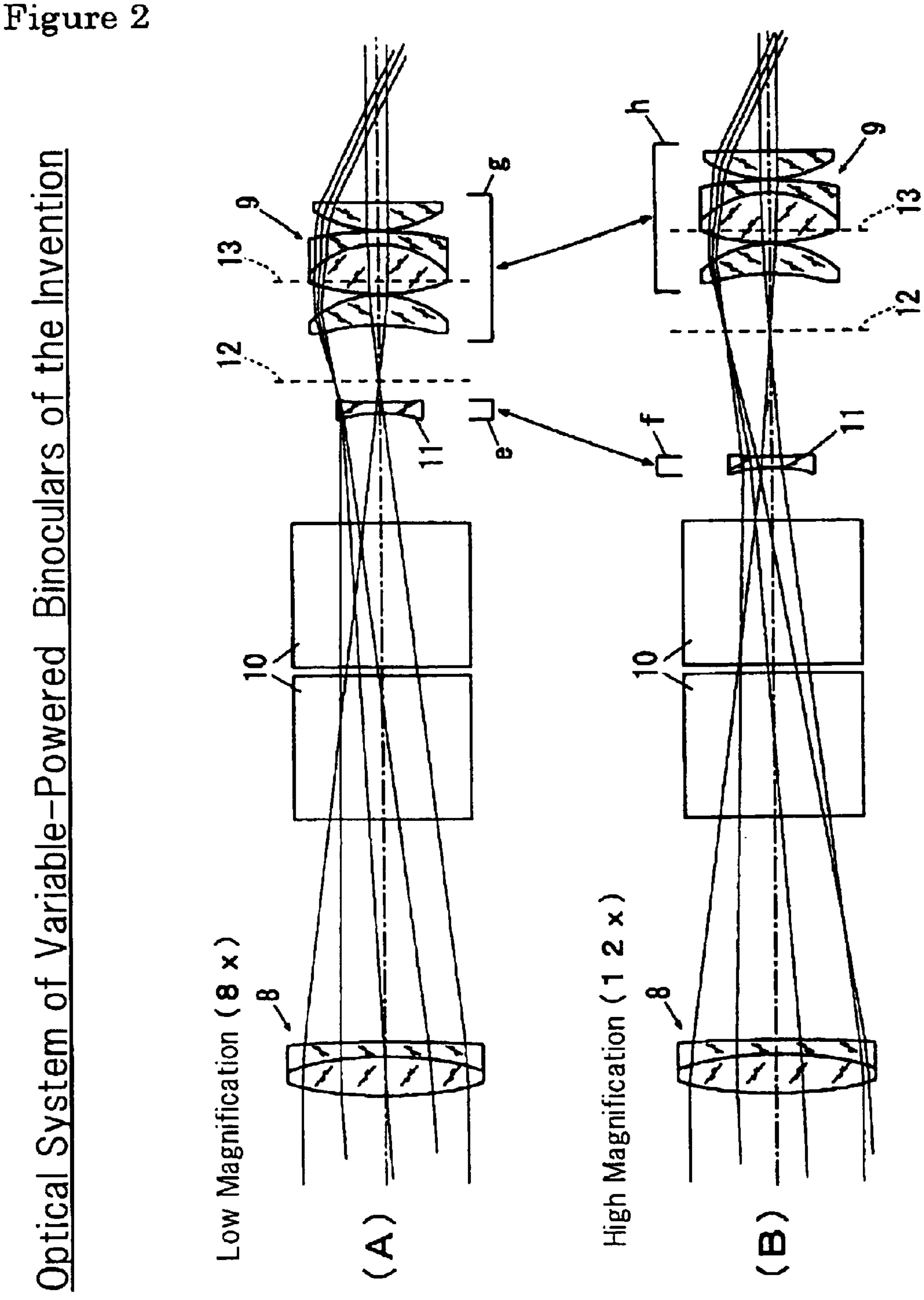
FIG. 2 is a schematic illustration of the optical system of the variable-powered binoculars in accordance with the present invention.

FIG. 2 is a schematic illustration of the optical system of the variable-powered binoculars in accordance with the present invention. FIG. 2(A) shows the optical system when the magnifying power is 8, which is a low magnification. FIG. 2(B) shows the optical system when the magnifying power is 12, a high magnification. In FIGS. 2(A) and 2(B), reference numeral 8 depicts an objective lens, reference numeral 9 an ocular lens system, reference numeral 10 a prism system, reference numeral 11 a concave adjusting lens comprising a concave lens, reference numeral 12 an objective image forming plane, and reference numeral 13 an apparent image forming plane. In the optical system shown in FIG. 2, the objective lens 8 and the prism system 10 are fixed. On the other hand, the ocular lens system 9 and the concave adjusting lens 11 are placed so that they can be moved along the optical axis of the variable-powered binoculars. The concave adjusting lens 11 is placed between the prism system 10 and the objective image-forming plane 12 in the binoculars. When the lenses are arranged for a low magnification as shown in FIG. 2(A), the concave adjusting lens 11 is located at position e. When the arrangement is changed from the low magnification one shown in FIG. 2(A) to the high magnification one shown in FIG. 2(B), the concave adjusting lens 11 is moved to position f, which shifts the objective image forming plane, and then the ocular lens system 9 is moved from position g in FIG. 2(A) to position h in FIG. 2(B) in accordance with the shift of the objective image forming plane. In other words, since the concave adjusting lens is moved along the optical axis, the focal length of the objective lens 8 is elongated. Then, the ocular lens system 9 is moved along the optical axis so that the focus of the ocular lens system 9 meets the focus of the objective lens 8, of which focal length has been elongated. The location where the apparent image is formed in relation to the position of the eye is the focal plane of the ocular lens system 9, which means that the focal length of the ocular lens system 9 is not changed. Therefore the width of the apparent visual field is kept essentially constant when the magnifying power of the binoculars is changed.

In summary, a change in the magnifying power effected by moving the concave adjusting lens 11 causes a change of the objective focal length and a shift of the objective image forming plane. Simultaneously, the whole ocular lens system 9 is moved in accordance with the shift of the objective image forming plane. In other word, the ocular lens system 9, which was fixed conventionally, is moved. Thus, the magnifying power of the binoculars is changed by moving the concave adjusting lens 11 and the ocular lens system 9.

The concave adjusting lens 11 and the ocular lens system 9 are moved by turning a zoom lever or zoom ring (not shown). When the zoom lever or zoom ring is turned, the concave adjusting lens 11 and the ocular lens system 9 are moved, with being interlocked, along the optical axis of the optical system of the binoculars. If the user would like to look at an enlarged image of the object, s/he can achieve it only by turning the zoom lever or zoom ring to the point that the desired magnification is obtained.

In the followings, I will explain examples of the present invention, referring to the attached figures.

EXAMPLES

Working Example 1

Figure 3:
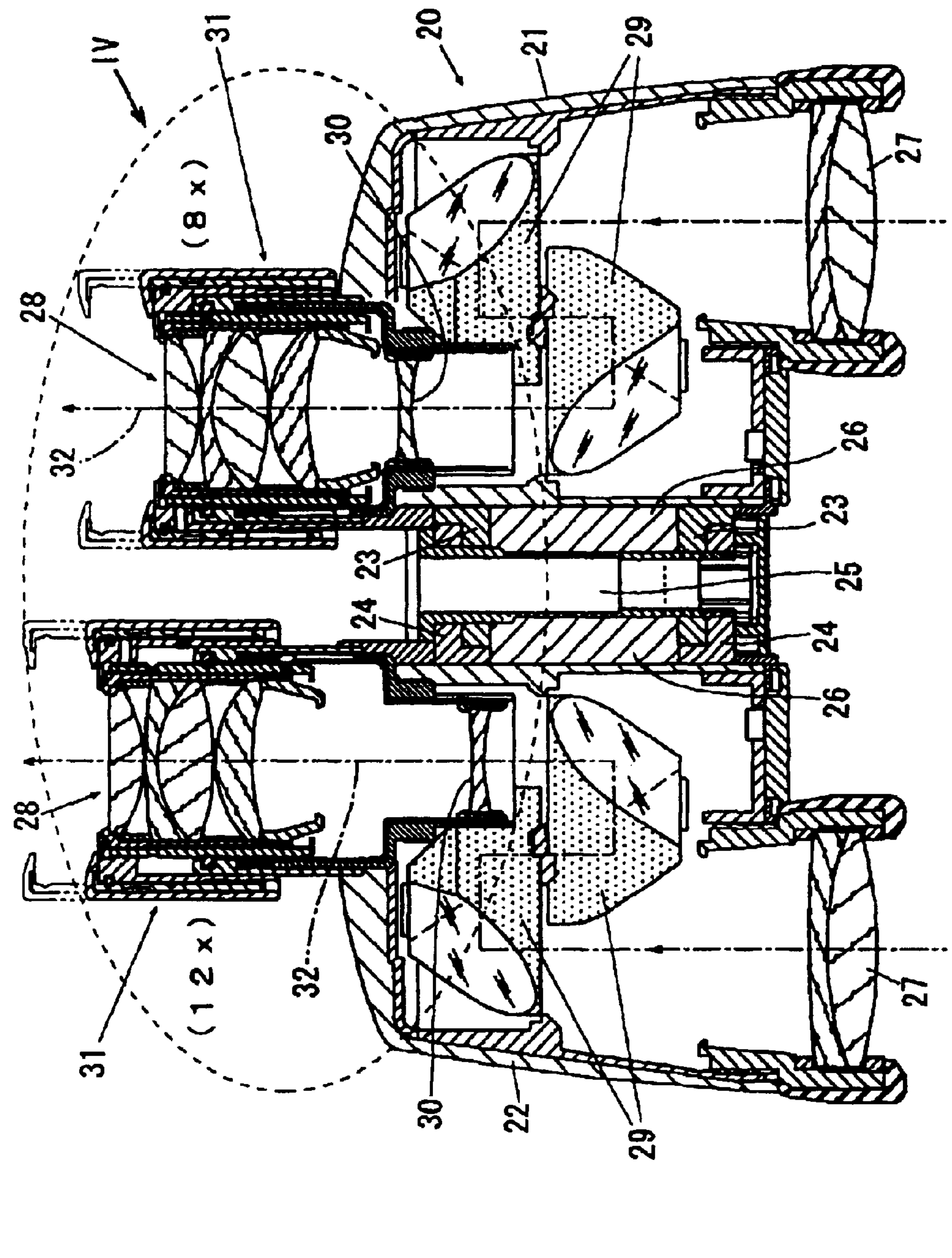
FIG. 3 is a sectional view of a first example of the variable-powered binoculars in accordance with the present invention.

FIGS. 3–13 show a first example of the present invention. As shown in FIG. 3, the pair of variable-powered binoculars is a pair of prism binoculars. The body thereof comprises the arm 23 of a scope 21 and the arm 24 of a scope 22 that are rotatably connected with a bridge 25. Central trunk rollers 26 are engaged with the bridge 25 so that the central trunk rollers can turn on the bridge in both directions. Each of the scopes 21 and 22 is provided with an objective lens 27, an ocular lens system 28 and Porro prisms 29. Light beams coming through the objective lens 27 advance through the Porro prisms 29 to the ocular lens system 28. The Porro prism 29 is an erecting prism. Between ocular lens systems 28 and their corresponding Porro prisms 29 are respectively placed concave adjusting lenses 30. Each ocular lens system 28 and the corresponding concave adjusting lens 30 are supported by a magnification-varying mechanism 31, with which each of the scopes 21 and 22 is provided, and interlocked with the mechanism. Thus the ocular lens system 28 and concave adjusting lens 30 are moved together along the optical axis 32.

Figure 4:
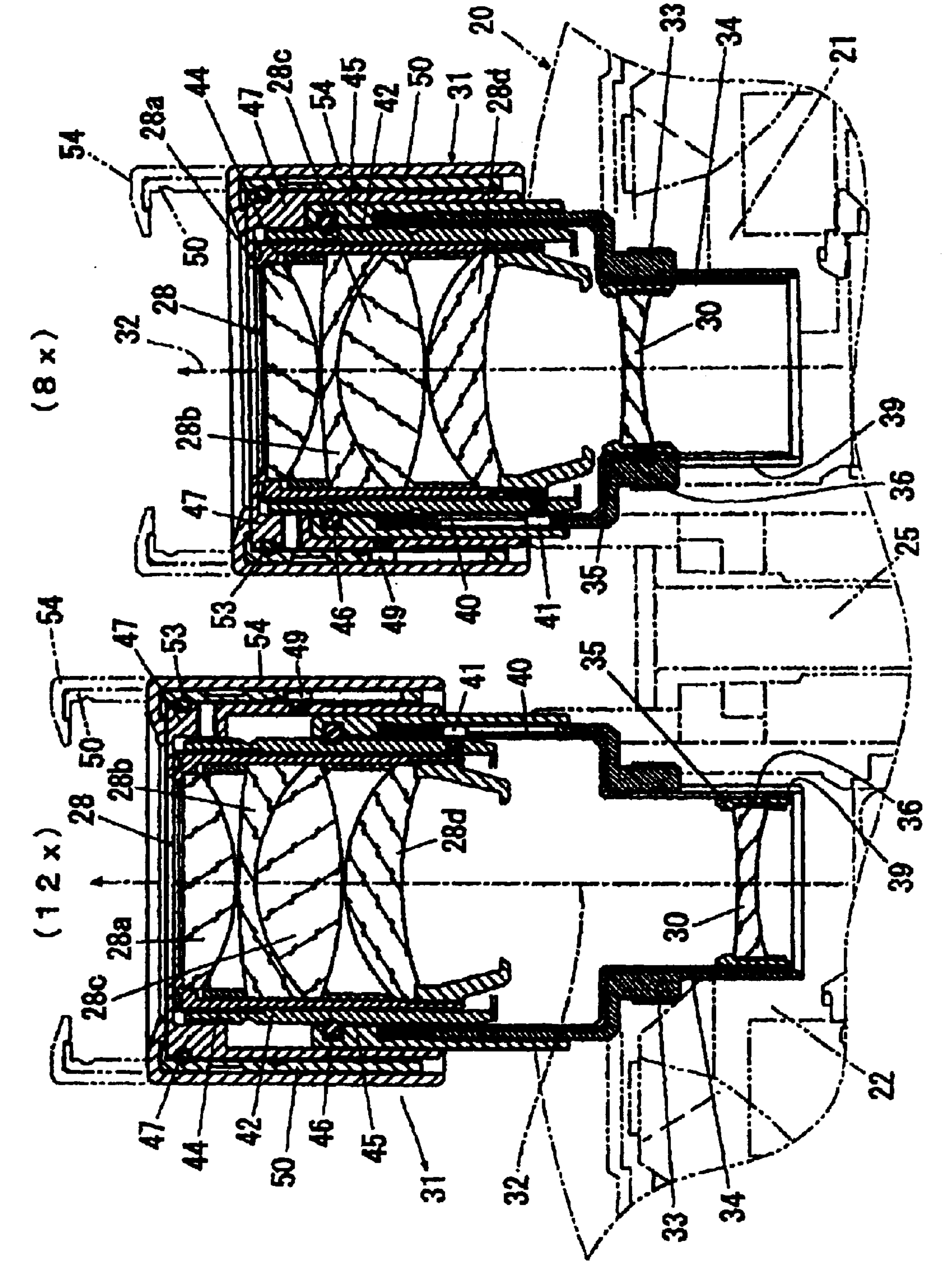
FIG. 4 is an enlarged view of Part IV, which is encircled within the ellipse in FIG. 3.
Figure 5:
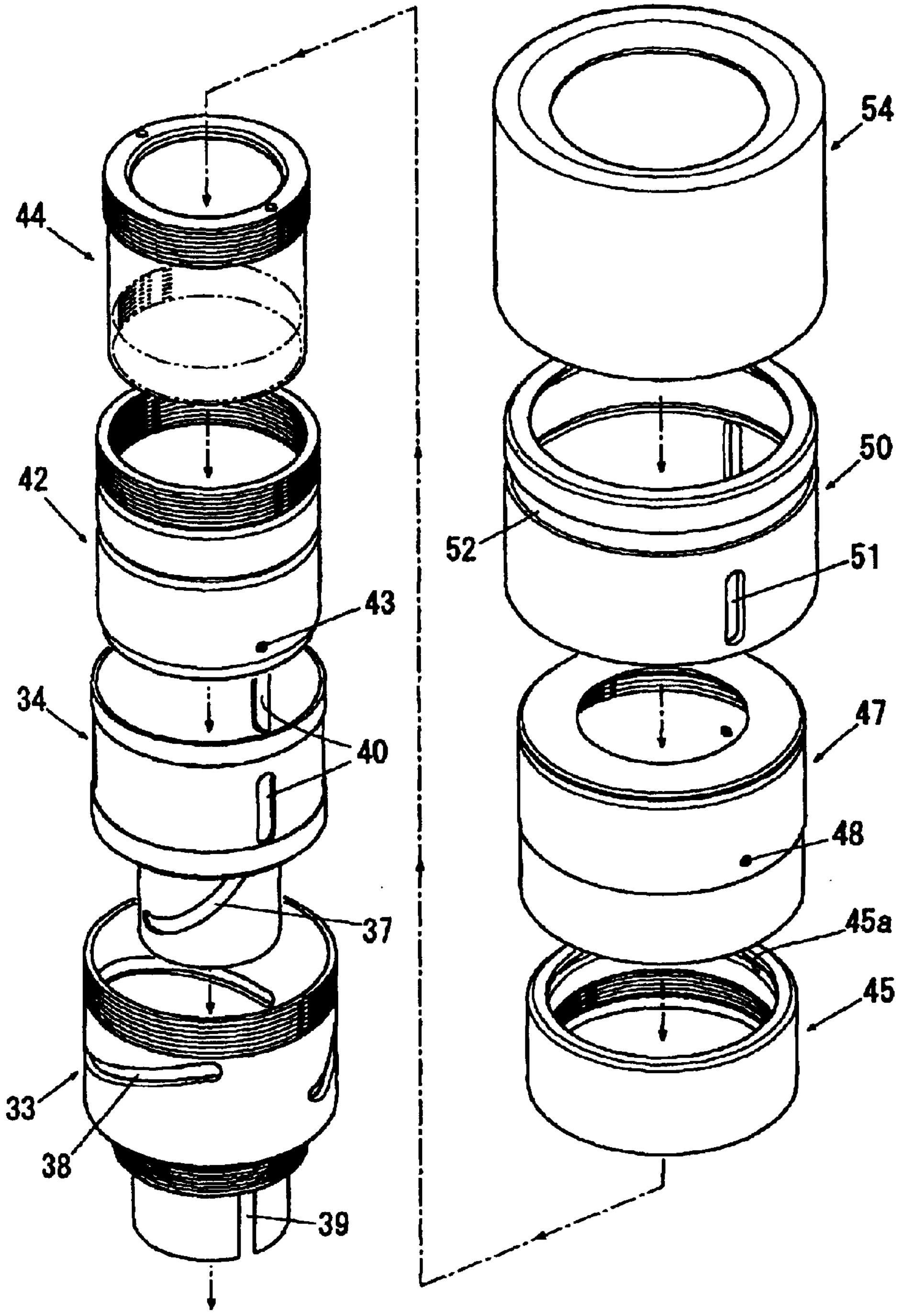
FIG. 5 is a perspective exploded view of the magnification-varying mechanism of the first example.
Figure 6:
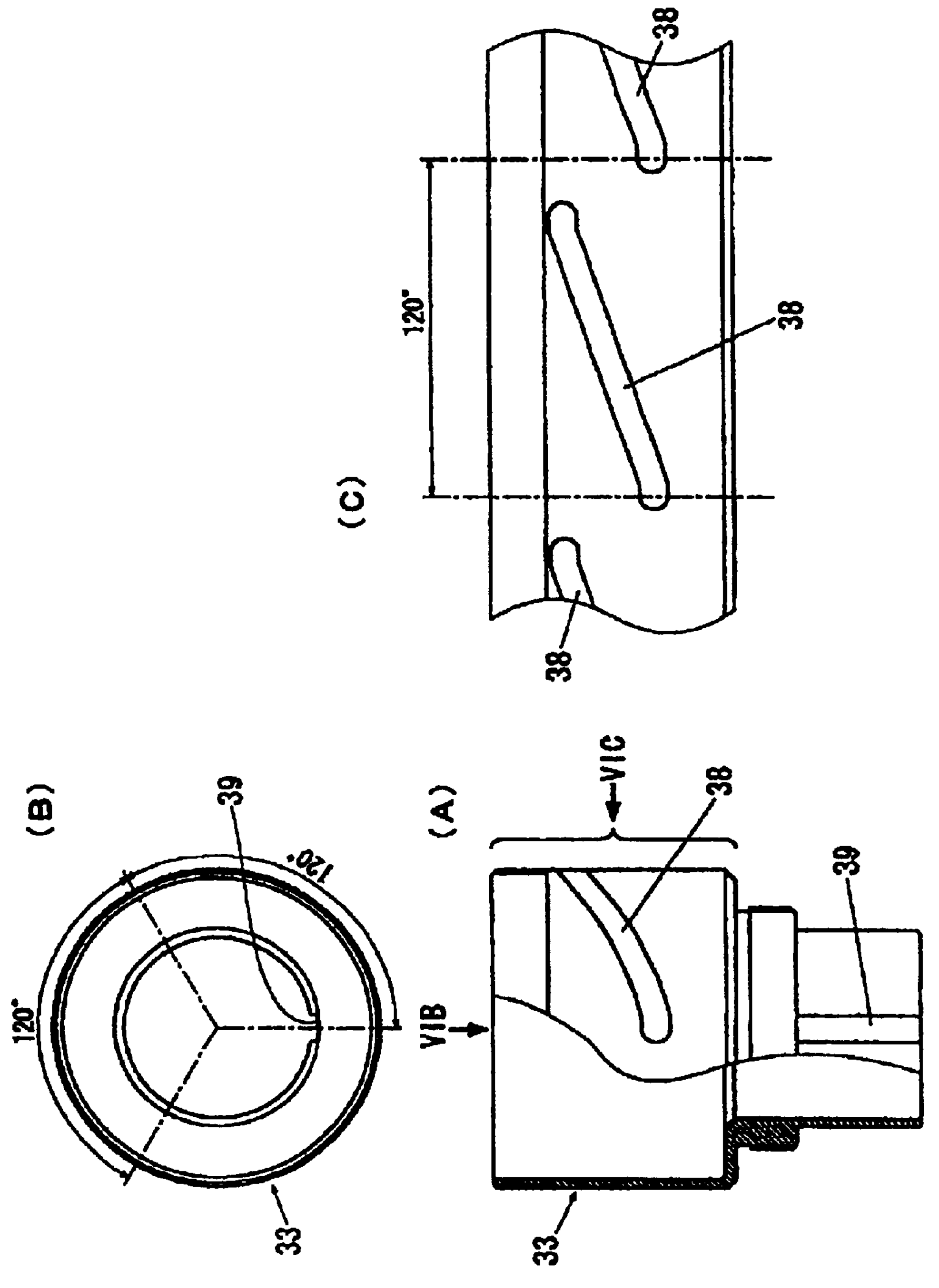
FIG. 6(A) is a side view of an outer cylinder of the ocular optical system, FIG. 6(B) a plan view of the outer cylinder, and FIG. 6(C) a side view showing a principal part of the outer cylinder.
Figure 7:
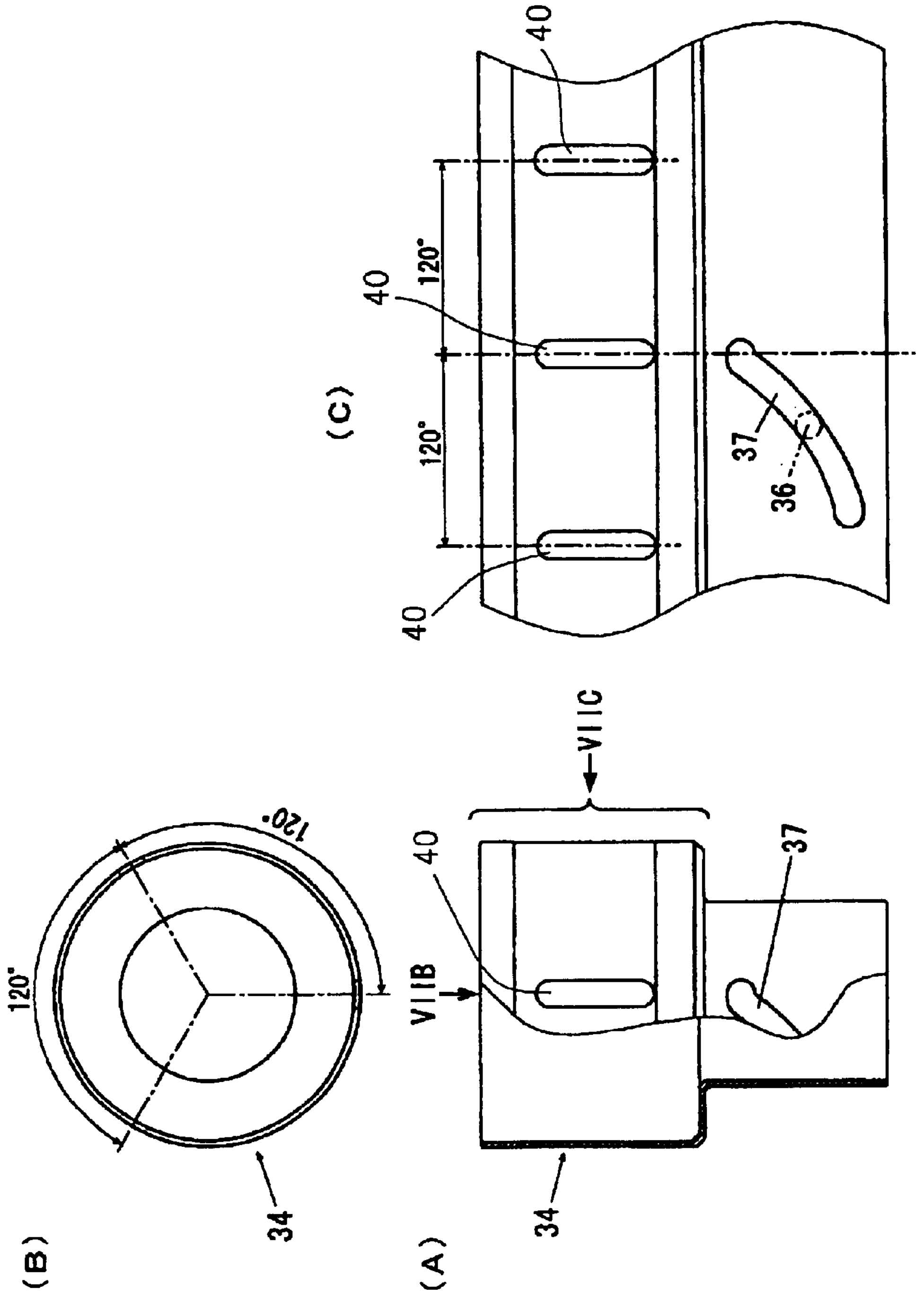
FIG. 7(A) is a side view of a cam inner cylinder, FIG. 7(B) a plan view of the cam inner cylinder, and FIG. 7(C) a side view showing a principal part thereof.
Figure 8:
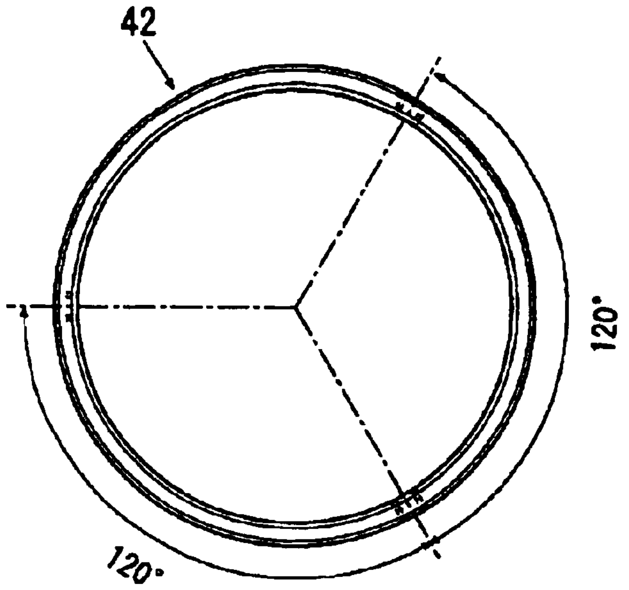
FIG. 8(A) is a side view of an ocular inner cylinder holder, and FIG. 8(B) a plan view of the ocular inner cylinder holder.
Figure 8:
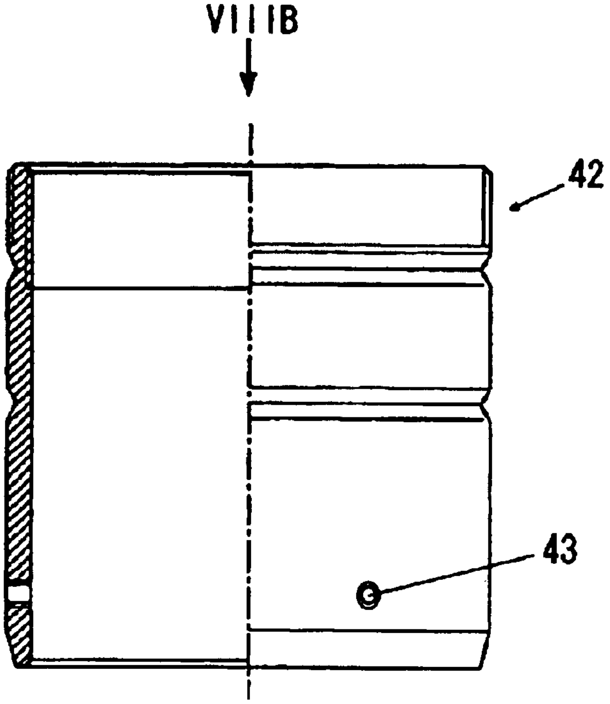

FIG. 4 is an enlarged view of the magnification-varying mechanism 31 in FIG. 3. FIG. 5 is a perspective exploded view of the magnification-varying mechanism 31. FIGS. 6–13 respectively show the principal components of the magnification-varying mechanism. The magnification-varying mechanism 31 comprises an ocular outer cylinder 33 shown in FIG. 6, which is fixed onto each of the ocular portions of the respective scopes 21 and 22; a cam inner cylinder 34 shown in FIG. 7, which is rotatably engaged with each ocular outer cylinder 33; and the concave adjusting lens 30 that is placed in the cam inner cylinder 34 so that it can move reciprocally along the optical axis 32. The concave adjusting lens 30 is fixed to a supporting cylinder 35, which can slidably move on the inner surface of the cam inner cylinder 34 along the optical axis 32. From the side face of the supporting cylinder 35 is projected a pin 36, which is engaged with a longitudinal guide 39 of the outer cylinder 33 through an inner cam guide 37 cut out of the cam inner cylinder 34. Reference numeral 38 depicts an outer cam guide made in the peripheral face of the ocular outer cylinder 33. Also, longitudinal guides 40 are cut out of the peripheral face of the cam inner cylinder 34. By inserting pins 41 into the longitudinal guides 40, an inner cylinder holder 42 shown in FIG. 8 is slidably fitted into the cam inner cylinder 34. The pins 41 are screwed and fixed in tapped holes 43 bored in the peripheral surface of the inner cylinder holder 42.

Figure 9:
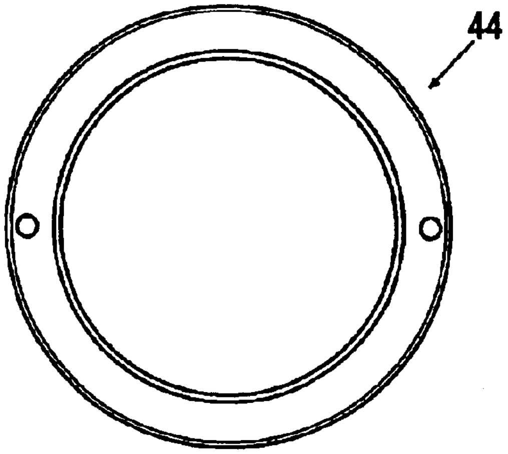
FIG. 9(A) is a side view of an ocular inner cylinder, and FIG. 9(B) a plan view of the ocular inner cylinder.
Figure 9:
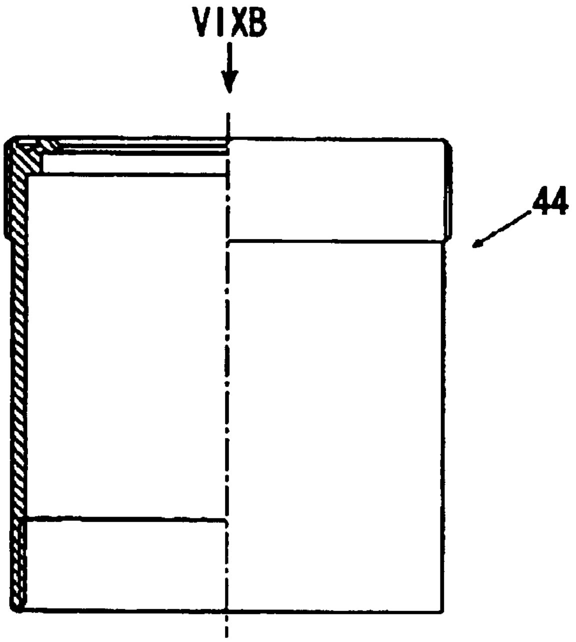
Figure 10:
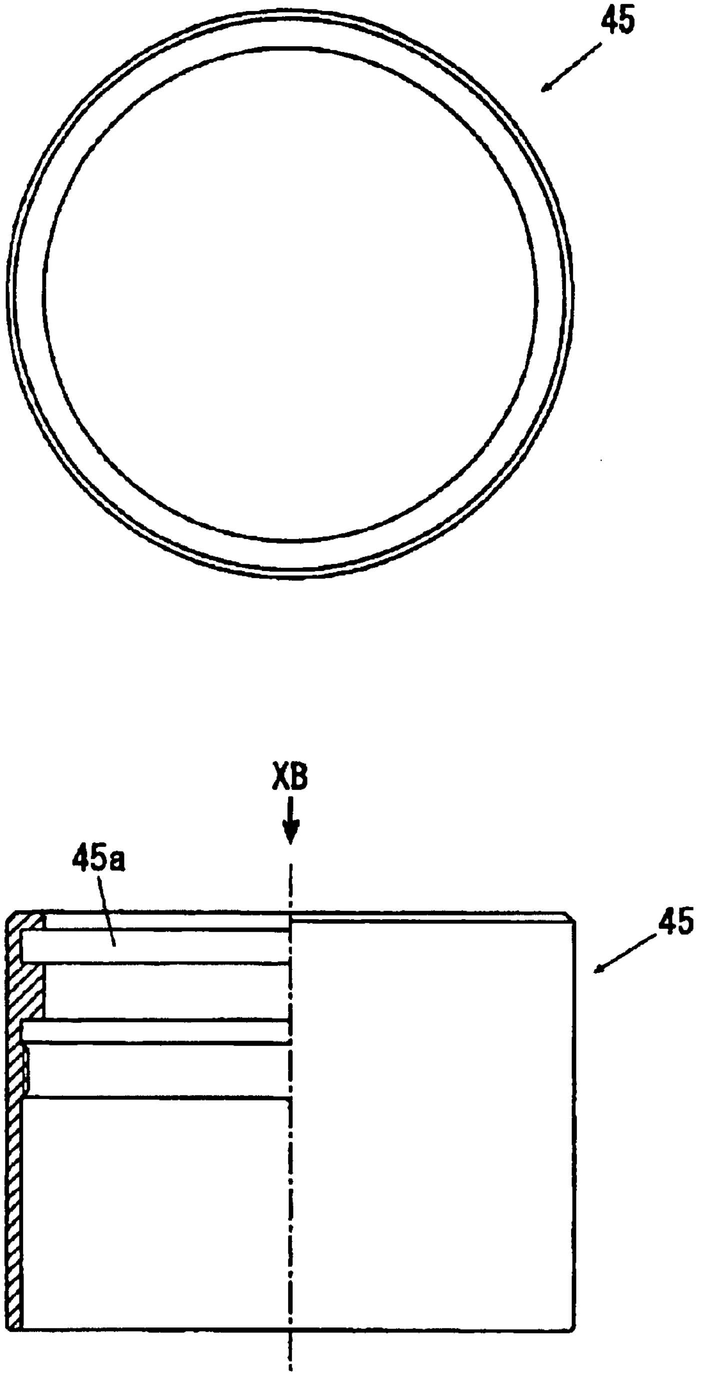
FIG. 10(A) is a side view of a cam inner cylinder retainer, and FIG. 10(B) a plan view of the retainer.

An ocular inner cylinder 44 shown in FIG. 9 is inserted into and fixed onto the inner cylinder holder 42. To the ocular inner cylinder are fixed ocular lenses **28*a*, 28*b*, 28*c* and 28*d* that comprise the ocular lens system 28. The inner cylinder holder 42 slidably moves along the longitudinal guides 40 formed in the cam inner cylinder 34 within the range of the length of the guides 40. When the inner cylinder holder 42 slides on the inner surface of the cam inner cylinder 34, the ocular inner cylinder 44 moves along the optical axis 32 together with the inner cylinder holder 42. As shown in FIG. 10, a cam inner cylinder retainer 45 is screwed with the outer peripheral face of the ocular outer cylinder 33 and is engaged with the upper end of the cam inner cylinder 34 to prevent the cylinder 34 from slipping out. On the inner surface of the cam inner cylinder retainer 45 is formed a ring groove 45*a* provided with a seal ring 46**.

Figure 11:
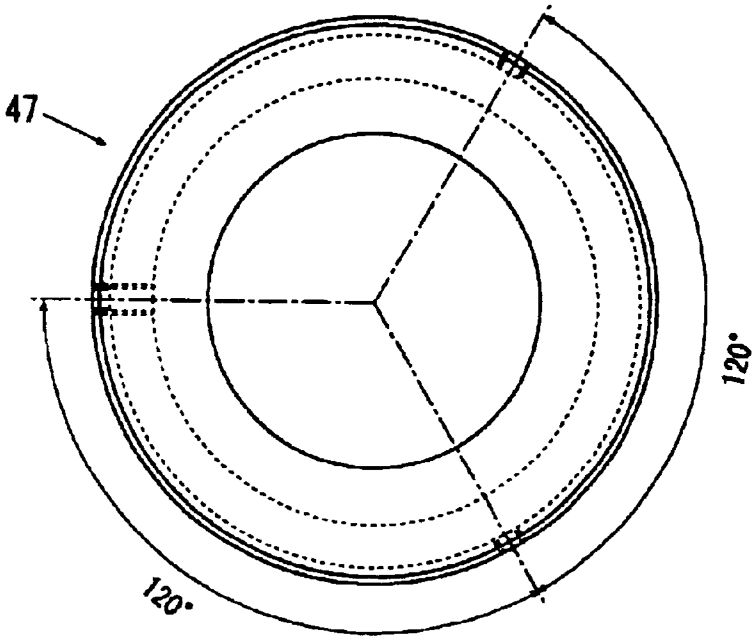
FIG. 11(A) is a side view of an outer support cylinder, and FIG. 11(B) a plan view of the outer support cylinder.
Figure 11:
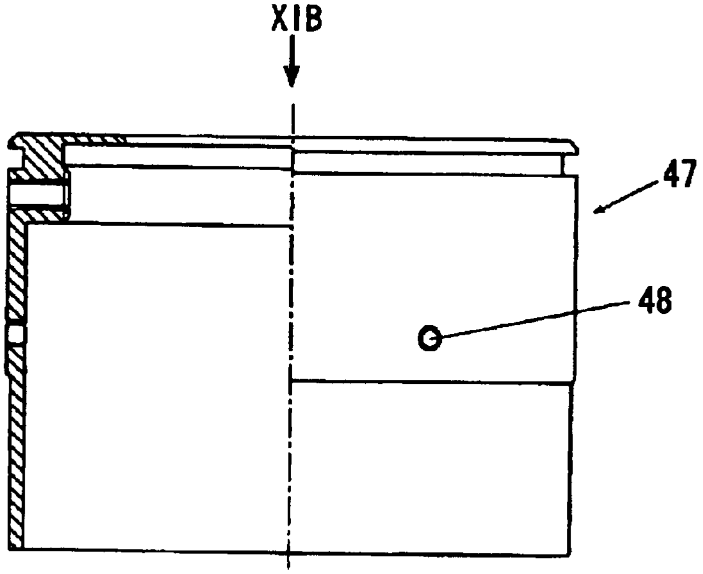
Figure 12:
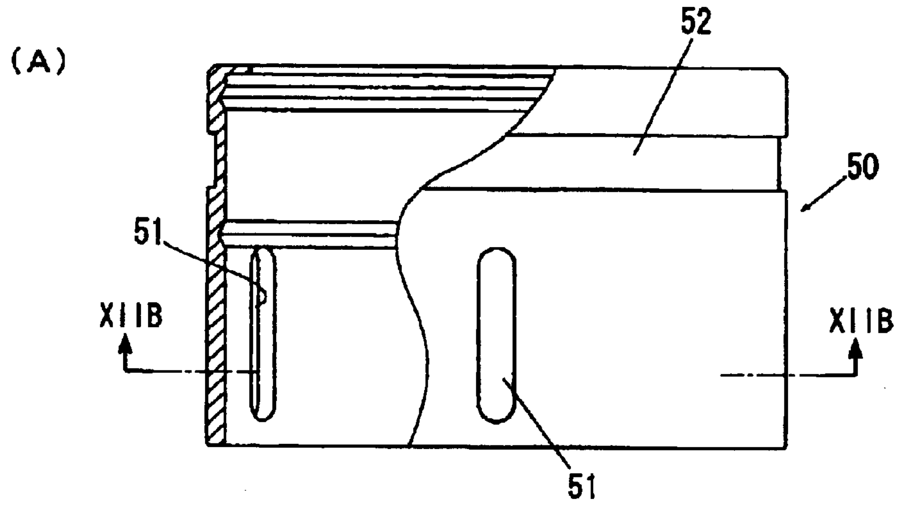
FIG. 12(A) is a side view of a pop-up ring, and FIG. 12(B) a plan view of the pop-up ring.
Figure 12:
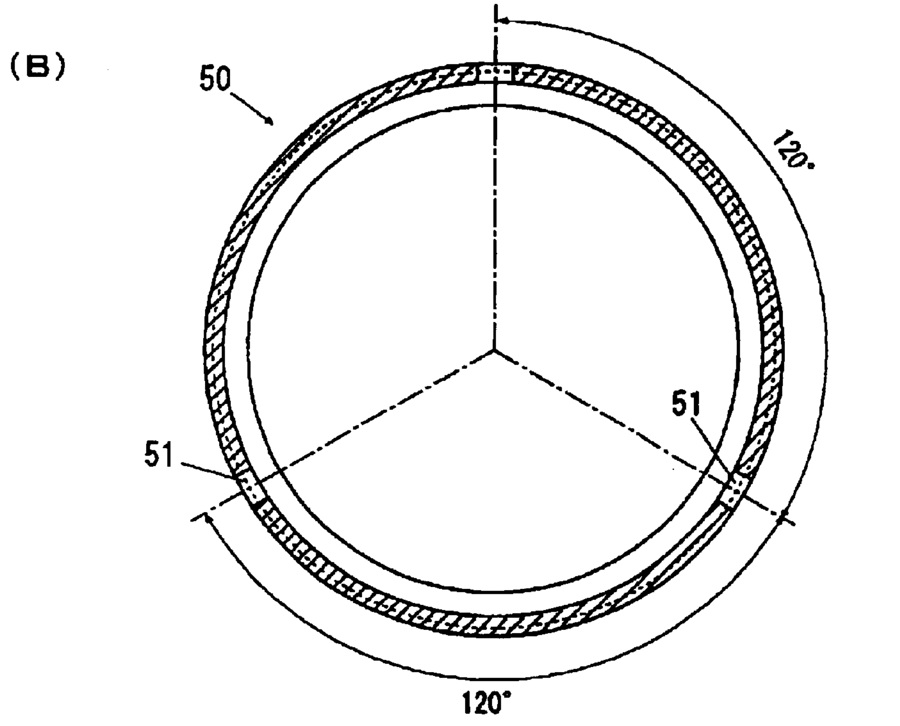
Figure 13:
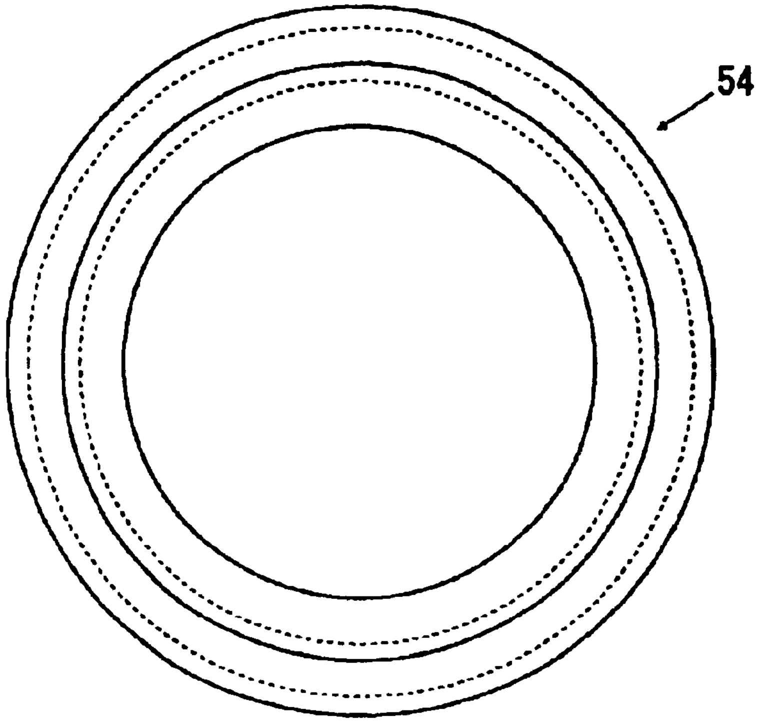
FIG. 13(A) is a side view of a rubber cup, and FIG. 13(B) a plan view of the rubber cup.
Figure 13:
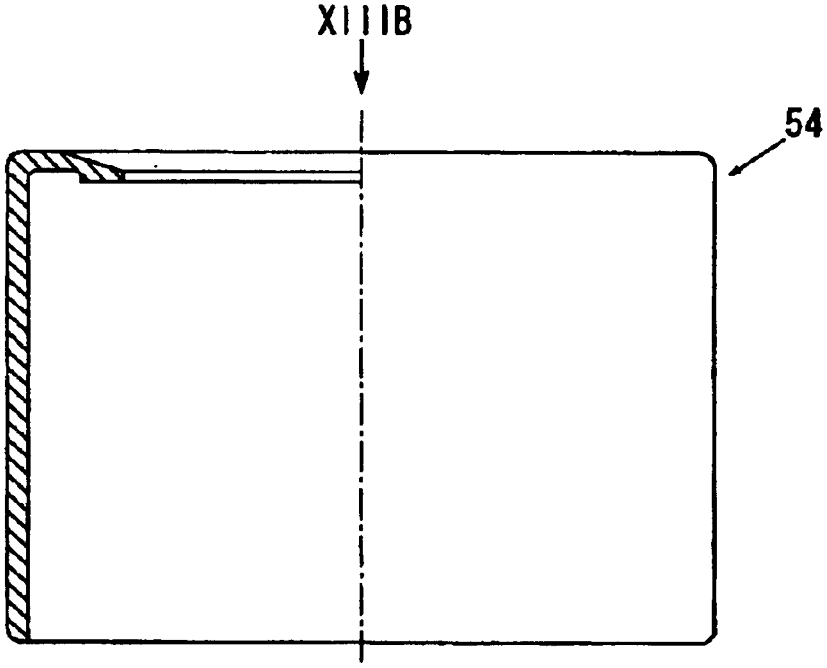

An outer support cylinder 47 shown in FIG. 11 is engaged with the outer peripheral surface of the cam inner cylinder retainer 45. In the peripheral face of the outer support cylinder 47 are bored tapped holes 48 with which screws 49 are engaged. The outer support cylinder 47 is fixed to the cam cylinder retainer 45 with the screws 49. As shown in FIG. 12 a pop-up ring 50 is slidably engaged with the outer peripheral face of the outer support cylinder 47. Longitudinal guides 51 are cut out of the peripheral face of the pop-up ring 50. The screws 50 are turned into the tapped holes 48 of the outer support cylinder 47 through the respective longitudinal guides 51. Reference numeral 52 depicts a ring groove formed on the outer peripheral surface of the pop-up ring 50. The ring groove 52 is provided with a sealing ring 53. Then, a rubber cup 54 is engaged with the outer peripheral surface of the pop-up ring 50 (FIG. 13). The rubber cup 54 together with the pop-up ring 50 can be extended from the binoculars 20. The state where the rubber cup 54 is extended together with the pop-up ring 50 is shown in FIG. 4 with a broken line.

Working Example 2

Figure 14:
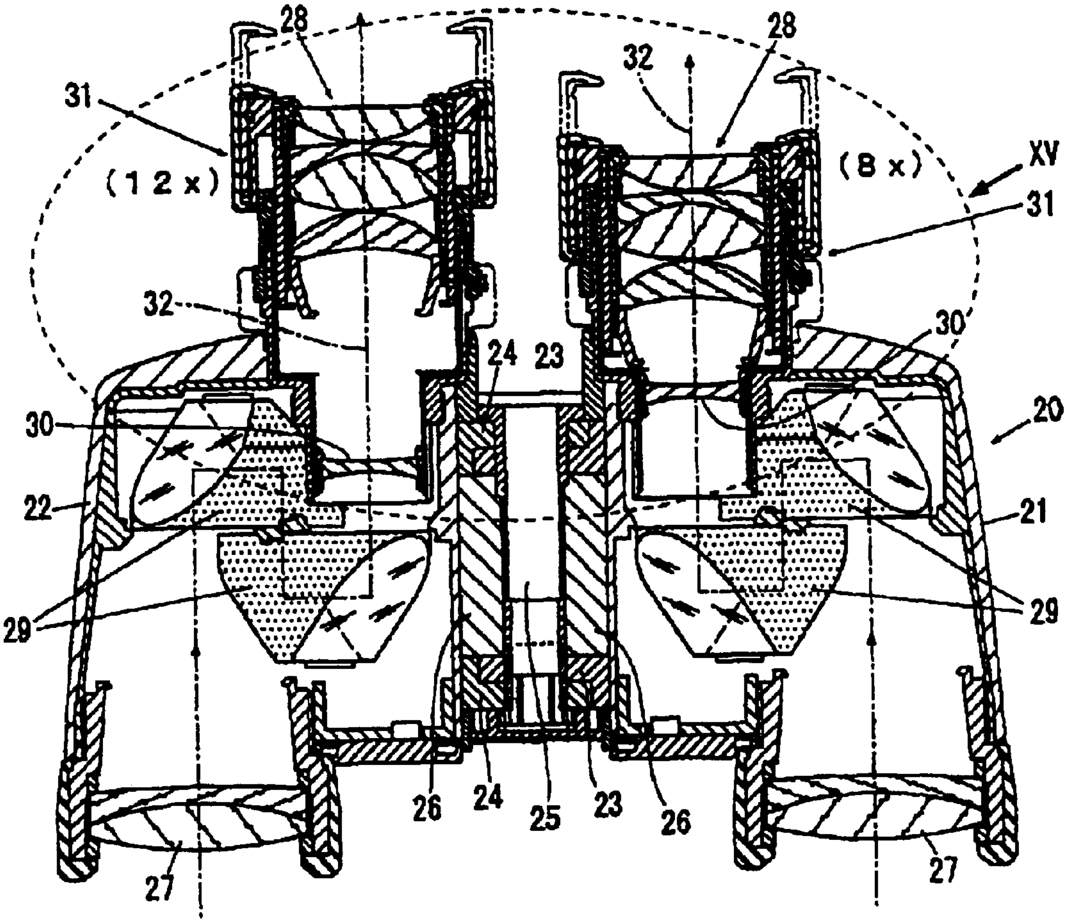
FIG. 14 is a sectional view of a second example of the variable-powered binoculars in accordance with the present invention.
Figure 15:
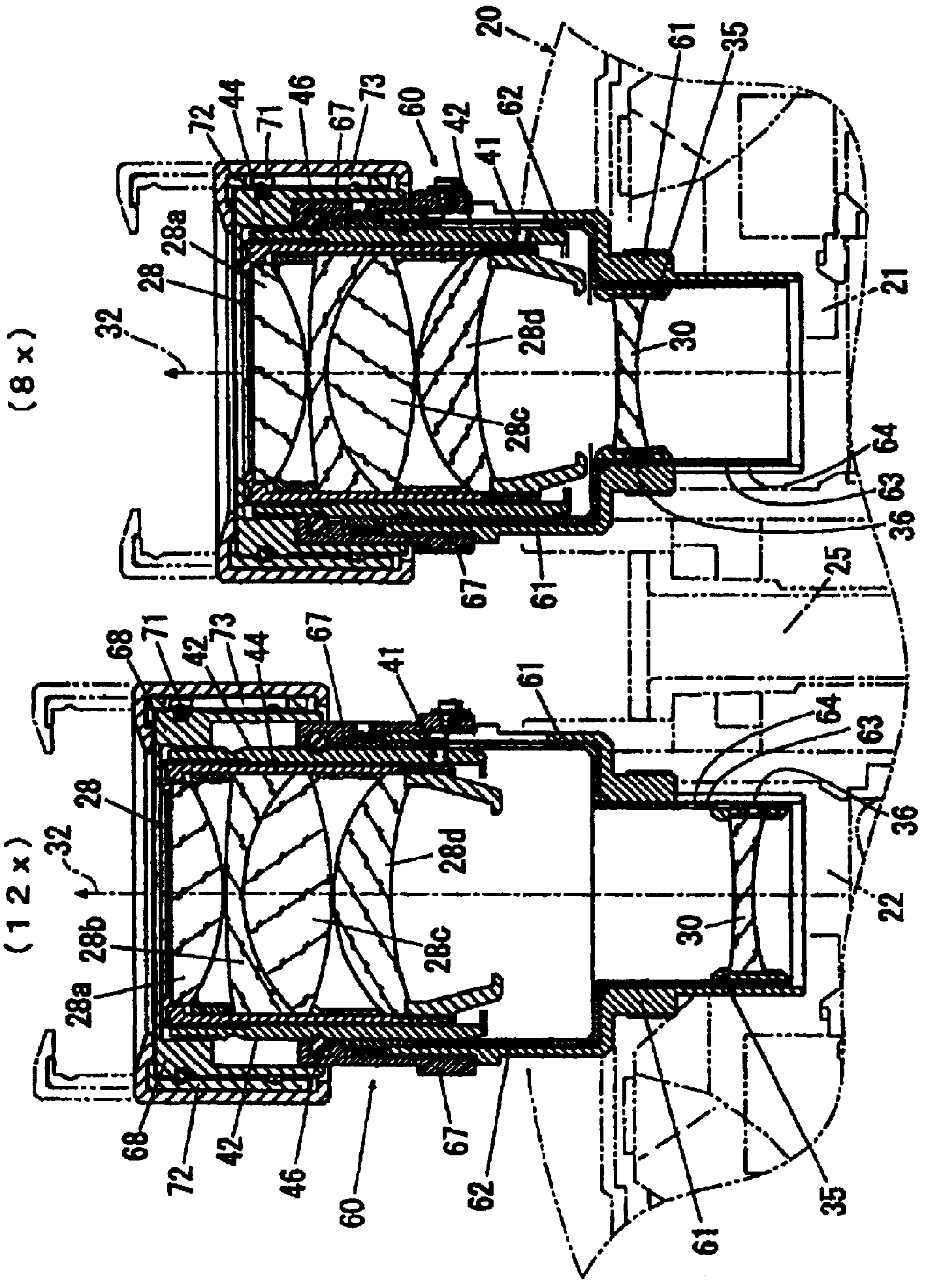
FIG. 15 is an enlarged view of Part XV, which is encircled within the ellipse in FIG. 14.
Figure 16:
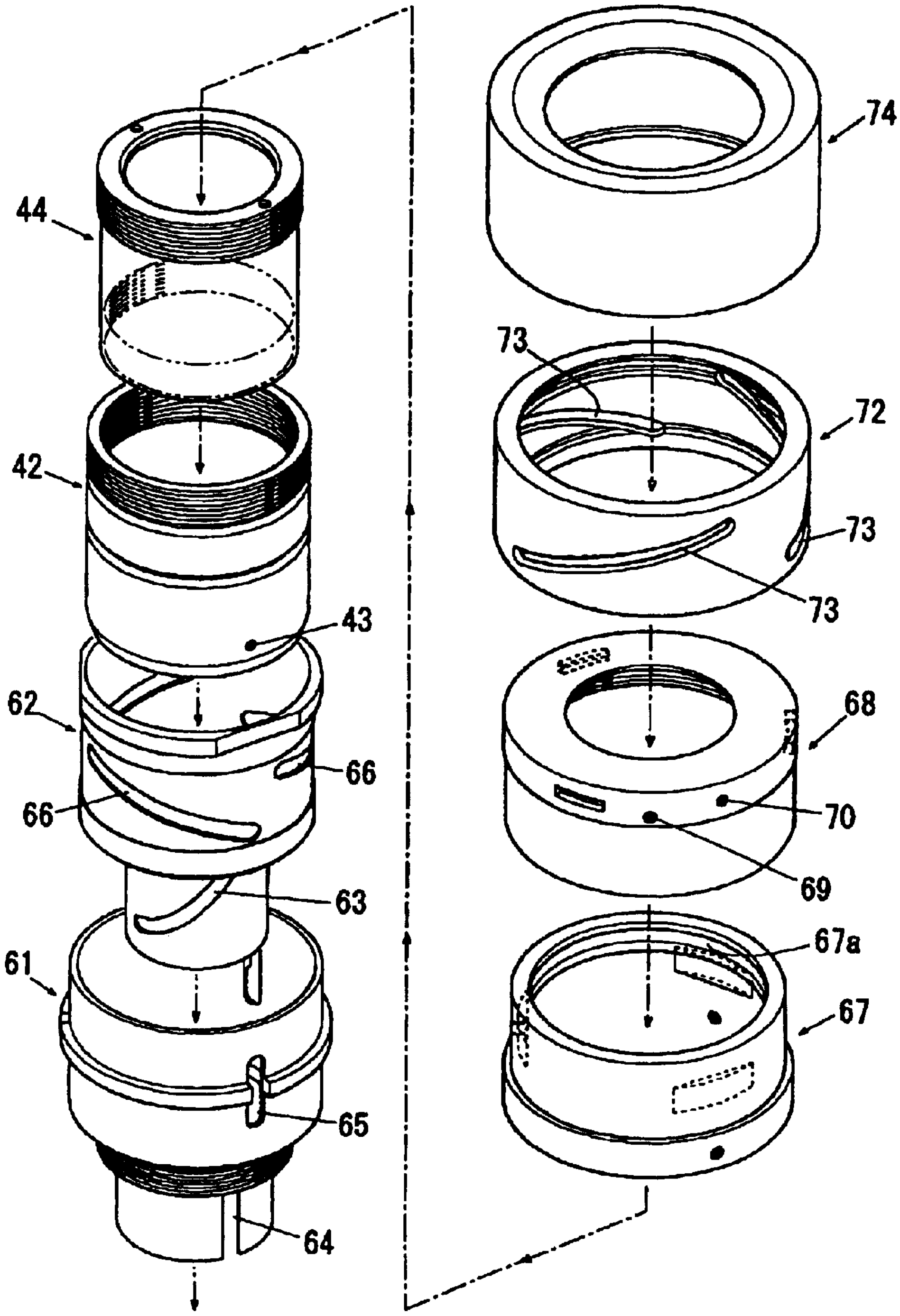
FIG. 16 is a perspective exploded view of the magnification-varying mechanism of the second example.
Figure 17:
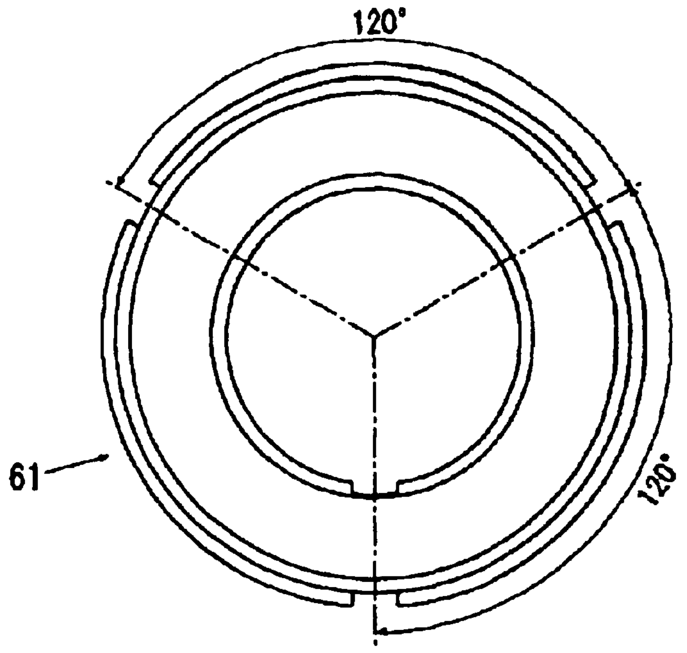
FIG. 17(A) is a side view of an outer cylinder of the ocular optical system, and FIG. 17(B) a plan view of the outer cylinder.
Figure 17:
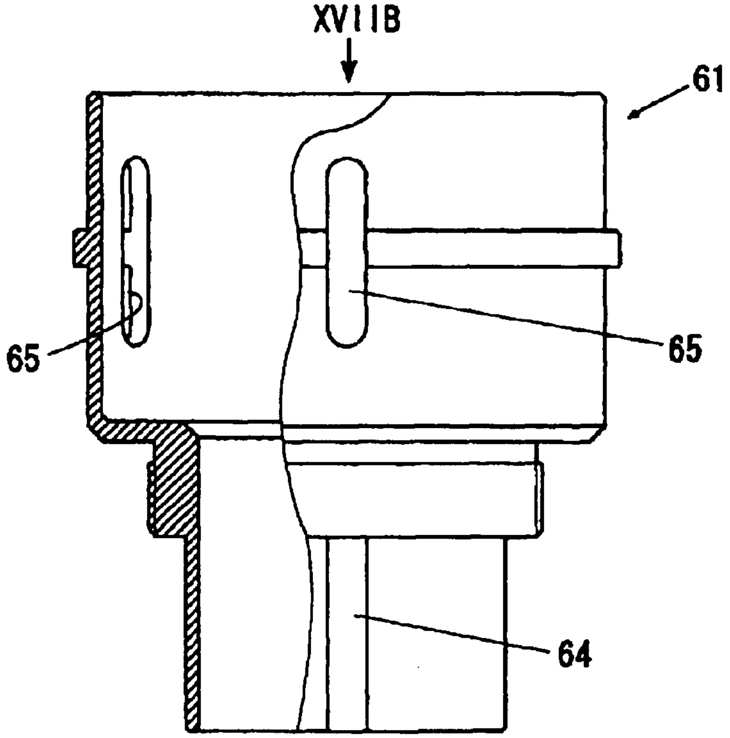
Figure 18:
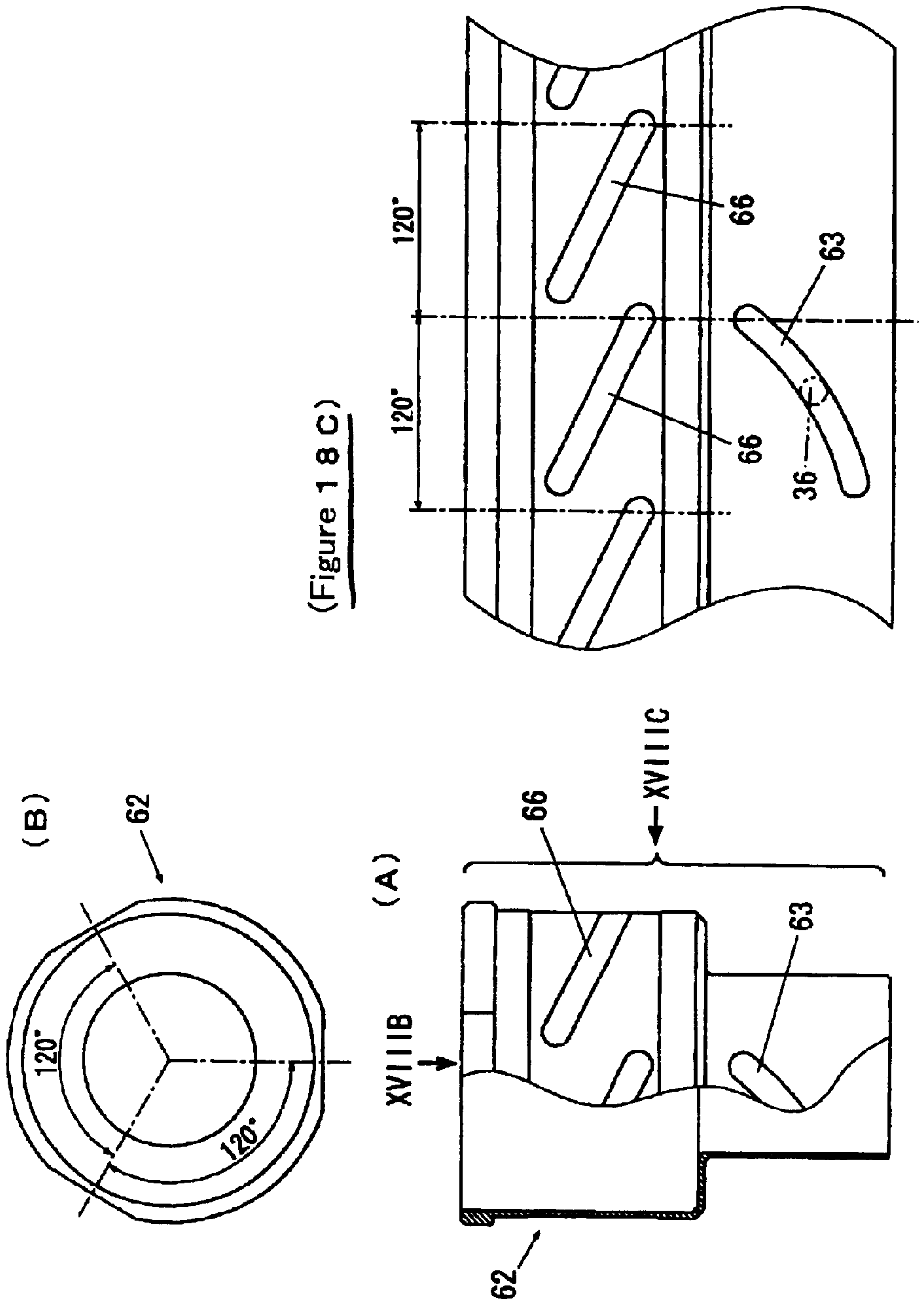
FIG. 18(A) is a side view of a cam inner cylinder, FIG. 18(B) a plan view of the cam inner cylinder, and FIG. 18(C) a side view showing a principal part of thereof.

FIGS. 14–27 show a second example of the variable-powered binoculars in accordance with the present invention. In these figures the same components as those shown in FIGS. 3–13 have the common reference numerals. FIG. 15 is an enlarged view of a magnification-varying mechanism 60 in FIG. 14. FIG. 16 is a perspective exploded view of the mechanism 60. FIGS. 17–27 respectively show the principal components of the magnification-varying mechanism 60. The mechanism 60 comprises an ocular outer cylinder 61 shown in FIG. 17, which is fixed onto each of the respective ocular portions of the scopes 21 and 22; a cam inner cylinder 62 shown in FIG. 18, which is rotatably engaged with each ocular outer cylinder 61; and a concave adjusting lens 30 that is placed in the cam inner cylinder 62 so that it can move reciprocally along the optical axis 32. The concave adjusting lens 30 is fixed to a supporting cylinder 35, which can slidably move on the inner surface of the cam inner cylinder 62 along the optical axis 32. From the side face of the supporting cylinder 35 is projected a pin 36, which is engaged with a longitudinal guide 64 of the ocular outer cylinder 61 through a first cam guide 63 made by cutting it out of the cam inner cylinder 62. Reference numeral 65 depicts second cam guides made in the peripheral face of the ocular outer cylinder 61. Also, third cam guides 66 are cut out of the peripheral face of the cam inner cylinder 62. By inserting pins 41 into the third cam guides 66, an inner cylinder holder 42 shown in FIG. 8 is slidably fitted into the cam inner cylinder 62. The pins 41 are screwed and fixed in tapped holes 43 bored in the peripheral surface of the inner cylinder holder 42.

Figure 19:
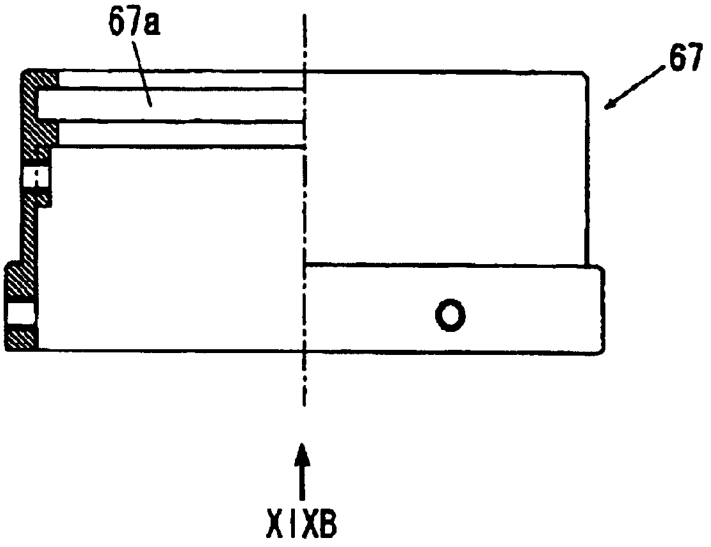
FIG. 19(A) is a side view of a cam inner cylinder retainer, and FIG. 19(B) a plan view of the retainer.
Figure 19:
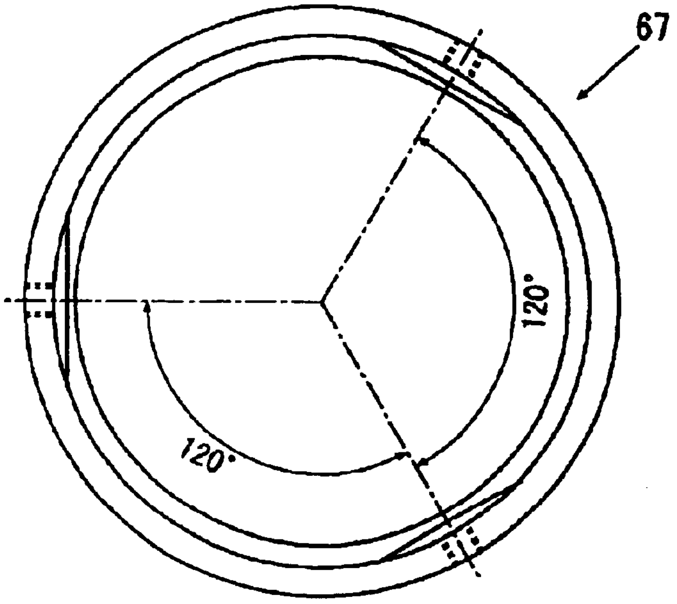

An ocular inner cylinder 44 shown in FIG. 9 is inserted into and fixed to the inner cylinder holder 42. To the ocular inner cylinder are fixed ocular lenses **28*a*, 28*b*, 28*c* and 28*d* that comprise the ocular lens system 28. The inner cylinder holder 42 can slidably move along the third cam guides 66 formed in the cam inner cylinder 62. When the inner cylinder holder 42 slides on the inner surface of the cam inner cylinder 62, the ocular inner cylinder 44 turns and moves along the optical axis 32 together with the inner cylinder holder 42. As shown in FIG. 19, a cam inner cylinder retainer 67 is screwed with the outer peripheral face of the ocular outer cylinder 61 and is engaged with the upper end of the cam inner cylinder 62 to prevent the inner cylinder 62 from slipping out. On the inner surface of the cam inner cylinder retainer 67 is formed a ring groove 67*a* provided with a seal ring 46**.

Figure 20:
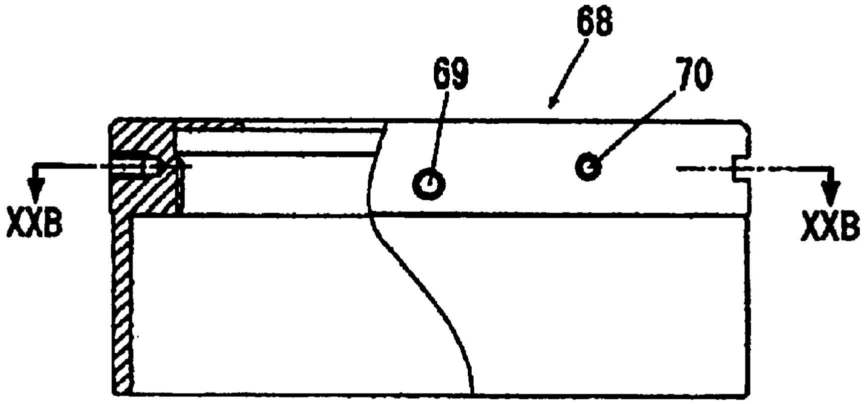
FIG. 20(A) is a side view of an outer support cylinder, and FIG. 20(B) a plan view of the outer support cylinder.
Figure 20:
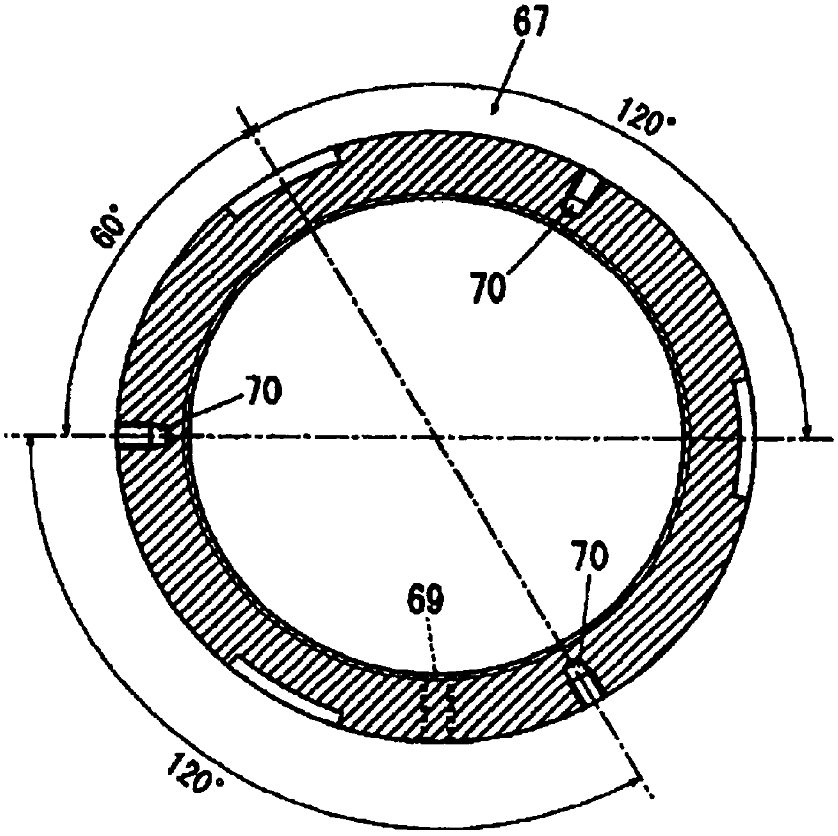
Figure 21:
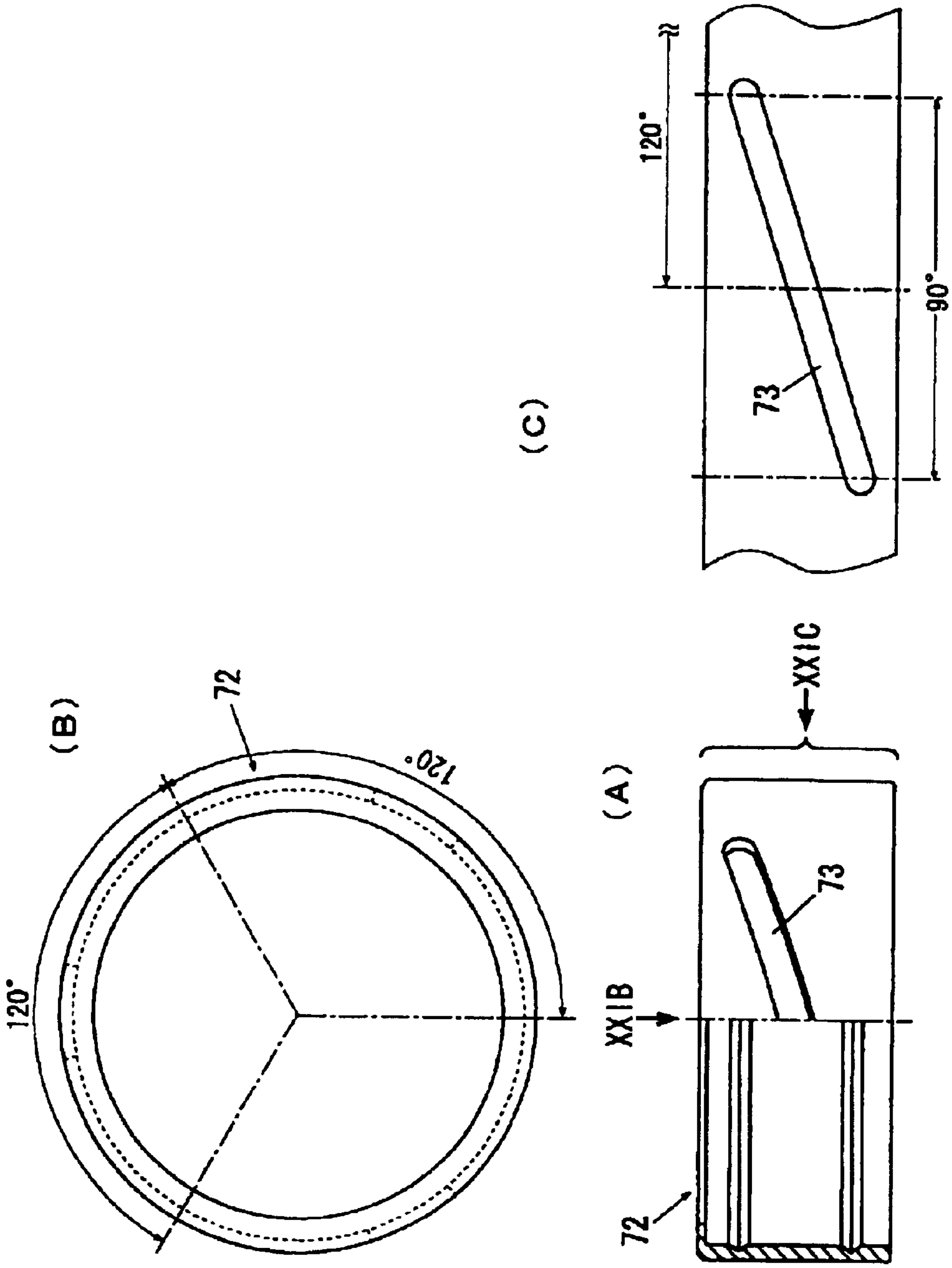
FIG. 21(A) is a side view of a twist ring, FIG. 21(B) a plan view of the twist ring, and FIG. 21(C) a side view showing a principal part thereof.
Figure 22:
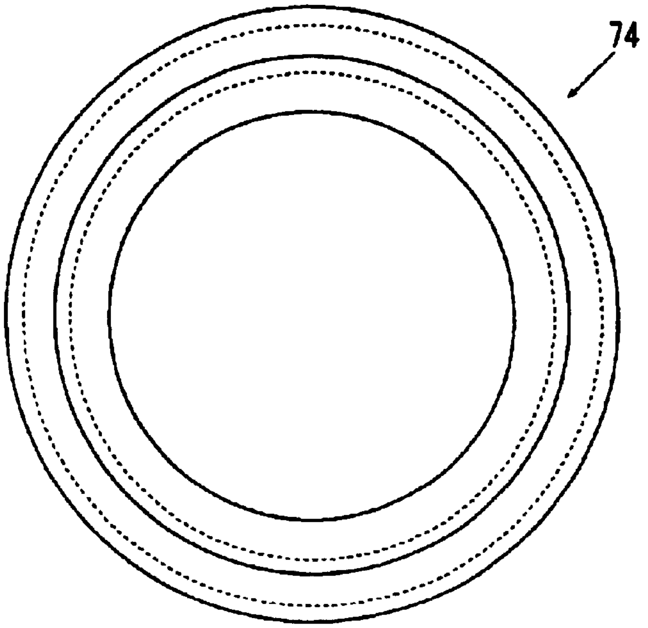
FIG. 22(A) is a side view of a rubber cup, and FIG. 22(B) a plan view of the rubber cup.
Figure 22:
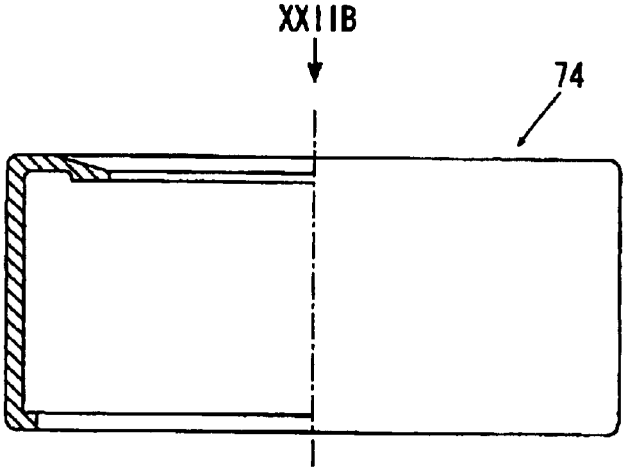

An outer support cylinder 68 shown in FIG. 20 is engaged with the outer peripheral surface of the cam inner cylinder retainer 67. In the peripheral face of the outer support cylinder 68 are bored tapped holes 69 with which screws are engaged. The outer support cylinder 68 is fixed to the cam cylinder retainer 67 with the screws. Also in the peripheral face of the outer support cylinder 68 are formed pin insertion openings 70 into which pins 71 are inserted and fixed. These pins 71 are engaged with cam guides cut out of a twist ring 72 shown in FIG. 21, with which a rubber cup 74 is engaged. When the twist ring 72 is turned, the rubber cup 74 together with the twist ring 72 can be extended from the binoculars 20. The state where the rubber cup 74 is extended together with the twist ring 72 is shown in FIG. 15 with a broken line. In FIG. 14, reference numeral 75 depicts a magnification-varying ring.

ADVANTAGES OF THE INVENTION

As explained above, the variable-powered binoculars of the present invention are, irrespective of the magnifying powers, capable of keeping constant the location where the apparent image is formed in relation to the ocular lens system, which keeps, in turn, the quality of the image constant. Another advantage is that the binoculars are capable of keeping the resolution constant from a low magnification to a high magnification, to an extent comparable to single-powered binoculars.

Also, the present invention provides the binoculars of which magnifying power is varied by moving the whole ocular system, and therefore the width of the apparent visual field is constant. Due to this feature, a wide visual field can be obtained. More specifically, because conventional zoom lens binoculars typically provide an apparent visual field of less than 40° at a low magnification, the visual field is so narrow that the user has troubles in observation. On the other hand, the binoculars in accordance with the present invention have an apparent visual field of which width is constant both at a low magnification and at a high magnification. Therefore the binoculars can assure an apparent visual field of 50° or more even when the arrangement for a low magnification is employed.

Moreover, because conventional zoom lens binoculars have a large difference between the eye relief at a low magnification and that at a high magnification, the user may have difficulties in observing some targets. On the other hand, the invention is able to reduce the difference. Therefore a clear observation of targets that were poorly observed with conventional binoculars can be achieved. Also, the invention provides an assurance of a longer eye relief, which is a still more advantage.

I claim:

1. A pair of variable-powered binoculars, comprising:

a pair of objective lens systems;

a pair of prism systems, each of the prism systems inverting an image that advances through a corresponding objective lens system, from an inverted image to an erecting image;

a pair of concave adjusting lenses, each of the concave adjusting lenses placed between a focus formed by the corresponding objective lens system and the corresponding prism system, so that each of the concave adjusting lenses is movable along the optical axis formed by the corresponding objective lens system and the corresponding prism system; and a pair of ocular lens systems, each of the ocular lens systems placed on the optical axis and defining an apparent image forming plane, so that each ocular lens system is movable along the optical axis closer to or away from the corresponding concave adjusting lens, synchronizing with a movement of the corresponding concave adjusting lens, wherein a respective one of the apparent image forming planes is fixed in a stationary state relative to the respective ocular lens system yet movable relative to a respective one of the concave adjusting lenses as each corresponding ocular lens system and each corresponding concave adjusting lens move closer to or away from each other.

2. The variable-powered binoculars as claimed in claim 1, wherein each of said ocular lens systems is movable on the optical axis so that the focus of each ocular lens system can be adjusted to a focus of the corresponding objective lens system that has been changed by the movement of the corresponding concave adjusting lens.

3. The variable-powered binoculars as claimed in claim 1, wherein each of the ocular lens systems comprises combined lenses.

4. The variable-powered binoculars as claimed in claim 2, wherein each of the ocular lens systems comprises combined lenses.

5. A variable-powered lens system, comprising:

an objective lens;

ocular lens assembly aligned along an optical axis with the objective lens;

a concave adjusting lens disposed in alignment with the optical axis and between the objective lens and the ocular lens assembly; and a movement mechanism operably connected to the ocular lens assembly and the concave adjusting lens for moving the lens assembly and the concave adjusting lens simultaneously either towards or away from one another along the optical axis, wherein the ocular lens assembly includes at least two ocular lens elements disposed in a stationary state relative to one another along the optical axis to define an apparent image forming plane extending perpendicularly through the optical axis and through the ocular lens assembly such that, when the movement mechanism is activated, the apparent image forming plane moves relative to the concave adjusting lens yet remains stationary relative to the ocular lens assembly.

6. The variable-powered lens system according to claim 5, wherein the at least two ocular lens elements contact each other at least at the optical axis.

* * * * *